(12) United States Patent
Ramaswamy et al.

(10) Patent No.: US 12,129,017 B2
(45) Date of Patent: Oct. 29, 2024

(54) SYSTEM AND METHOD FOR PERFORMING DEVICE ANALYTICS

(71) Applicant: Hamilton Sundstrand Corporation, Charlotte, NC (US)

(72) Inventors: Sitaram Ramaswamy, West Hartford, CT (US); Dale W. Maine, Simsbury, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 142 days.

(21) Appl. No.: 16/428,606

(22) Filed: May 31, 2019

(65) Prior Publication Data

US 2020/0377197 A1    Dec. 3, 2020

(51) Int. Cl.
*B64C 19/00*     (2006.01)
*B64D 45/00*    (2006.01)
*G06N 5/043*    (2023.01)

(52) U.S. Cl.
CPC .............. *B64C 19/00* (2013.01); *B64D 45/00* (2013.01); *B64D 2045/0085* (2013.01); *G06N 5/043* (2013.01)

(58) Field of Classification Search
CPC ................. G06F 11/0739; B64C 19/00; B64D 2045/0085; B64D 45/0059
See application file for complete search history.

(56) References Cited

U.S. PATENT DOCUMENTS

| | | | |
|---|---|---|---|
| 7,950,044 B2 | 5/2011 | Brandt et al. | |
| 8,766,797 B2 | 7/2014 | Hamm et al. | |
| 10,234,853 B2 | 3/2019 | Mukkamala et al. | |
| 2004/0176887 A1* | 9/2004 | Kent | G05B 23/0221 701/29.5 |
| 2011/0115649 A1* | 5/2011 | Smith | G06F 11/079 340/963 |
| 2017/0277185 A1* | 9/2017 | Duda | B64D 45/00 |
| 2020/0193363 A1* | 6/2020 | Jones | H04L 63/10 |

FOREIGN PATENT DOCUMENTS

| | | |
|---|---|---|
| EP | 2325826 A1 | 5/2011 |
| WO | 03/021503 A2 | 3/2003 |

OTHER PUBLICATIONS

Extended European Search Report dated Jun. 4, 2020, issued during the prosecution of European Patent Application No. EP19211205.0.

* cited by examiner

*Primary Examiner* — Andrew J Cromer

(57) ABSTRACT

A computer system and method for optimizing operation of a device having associated software routines for operating the device in which data associated with a device is received that is indicative of alert conditions present in the device. The received data associated with the alert conditions is analyzed to determine corrective actions to mitigate the alert conditions. Actors for implementing the determined corrective actions is determined based upon the alert conditions and the determined corrective actions. A determination is made we to whether the determined corrective actions have been successfully implemented to mitigate the alert conditions. A determination is then performed as to whether alteration of the corrective actions is required to mitigate the alert conditions.

20 Claims, 3 Drawing Sheets

SYSTEM AND METHOD FOR PERFORMING DEVICE ANALYTICS

FIELD

The disclosed embodiments generally relate to managing devices, and more particularly, to mitigating alert conditions in managed devices.

BACKGROUND

Development of data analytics and the conversion of insights gathered from data analytics into mitigation actions typically requires access to data by expert technicians needed and trained to review and act on the insights garnered from the data. For instance, restricting access to suppliers, customers, technicians and employees on a need-based basis is highly desirable from the viewpoint of data ownership and security. Also, as the number of analytics from software embedded in devices increases, manual management of such access control can become costly emphasizing the current need for performing more efficient analytics that mitigates improper operation of a device and presents an opportunity for businesses to alter and enhance operations.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system and method for optimizing operation of a device (e.g., an aircraft) having one or more associated software routines for operating the device is described in which data associated with a device is received that is indicative of one or more alert conditions present in the device. The received data associated with the one or more alert conditions is analyzed to determine one or more corrective actions to mitigate the one or more alert conditions. One or more actors for implementing the one or more determined corrective actions is determined based upon the one or more alert conditions and the determined one or more corrective actions. A determination is made we to whether the one or more determined corrective actions have been successfully implemented to mitigate the one or more alert conditions. A determination is then performed as to whether alteration of the one or more corrective actions is required to mitigate the one or more alert conditions.

It is to be understood and appreciated that the aforesaid received data indicative of one or more alert conditions can originate from the device itself (e.g., an aircraft) or from another device/system external (e.g., a component manufacturer) to the device (e.g., the aircraft). For instance, a defect detected in one engine (associated with another aircraft/device) can result in a fleet wide alert for all engines. This may be in the form of a service bulletin, recall notice or a retrofit directive. In this scenario, the alerts are not directly generated from the device (e.g., an aircraft) itself but rather via external data or external policies or external directives.

BRIEF DESCRIPTION OF FIGURES

The accompanying appendices and/or drawings illustrate various non-limiting, example, inventive aspects in accordance with the present disclosure.

DETAILED DESCRIPTION

Figure 1:
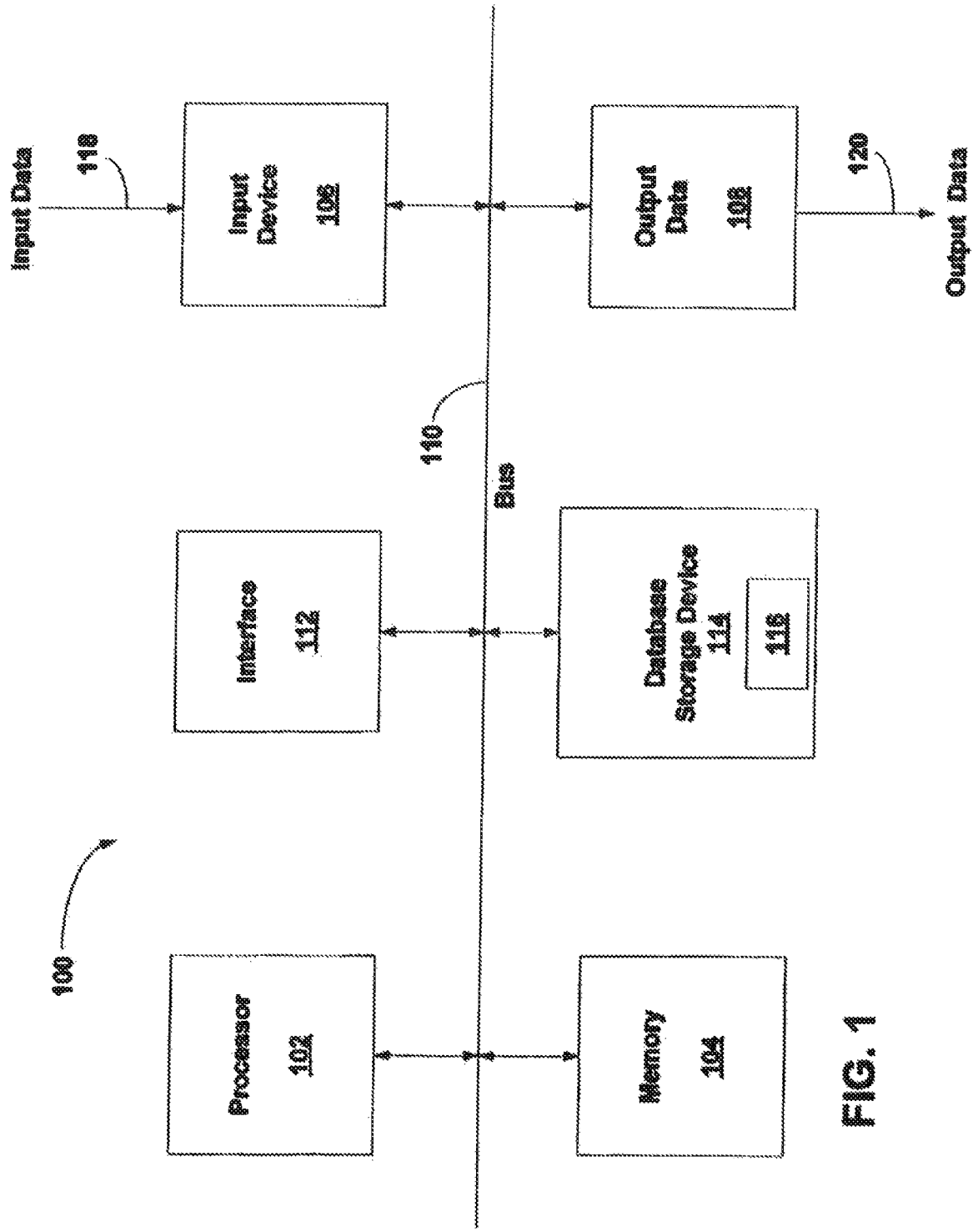
FIG. 1 is a block diagram illustrating a computer system, components of which are used with embodiments of the present disclosure.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As will be appreciated, the illustrated embodiments generally consist of a computer system and method for providing data analytics on a device preferably having one or more software subroutines capable of generating one or more alert conditions/messages/signals indicative of a fault, or a predictive fault, associated with the device. As described in detail below, the illustrated embodiments receive data associated with the device that is indicative of one or more alert conditions present in the device. The received data associated with the one or more alert conditions is analyzed to determine one or more corrective actions to mitigate the one or more alert conditions. One or more actors are identified/determined for implementing the one or more determined corrective actions preferably based upon the one or more alert conditions and the determined one or more corrective actions. A determination is then preferably made as to whether the one or more determined corrective actions have been successfully implemented to mitigate the one or more alert conditions and whether alteration of the one or more corrective actions is required to mitigate the one or more alert conditions.

Turning now descriptively to the drawings, in which similar reference characters denote similar elements throughout the several views, FIG. 1 depicts an exemplary computing system.

A generalized computing embodiment in which the illustrated embodiments can be realized is depicted in FIG. 1 illustrating a processing system 100 that may be used (or components thereof) with one or more embodiments described herein, e.g., as one of the components shown in the below described system 200 coupled to one or more devices 300. Processing system 100 generally consists of at least one processor 102, or processing unit or plurality of processors, memory 104, at least one input device 106 and at least one output device 108, coupled together via a bus or group of buses 110. In certain embodiments, input device 106 and output device 108 can be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 can comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 can come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 can be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 can be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 preferably operates in a networked environment using logical connections to one or more remote computers, servers and/or databases. The remote computer may be a personal computer, a tablet device, smart phone device, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

Figure 2:
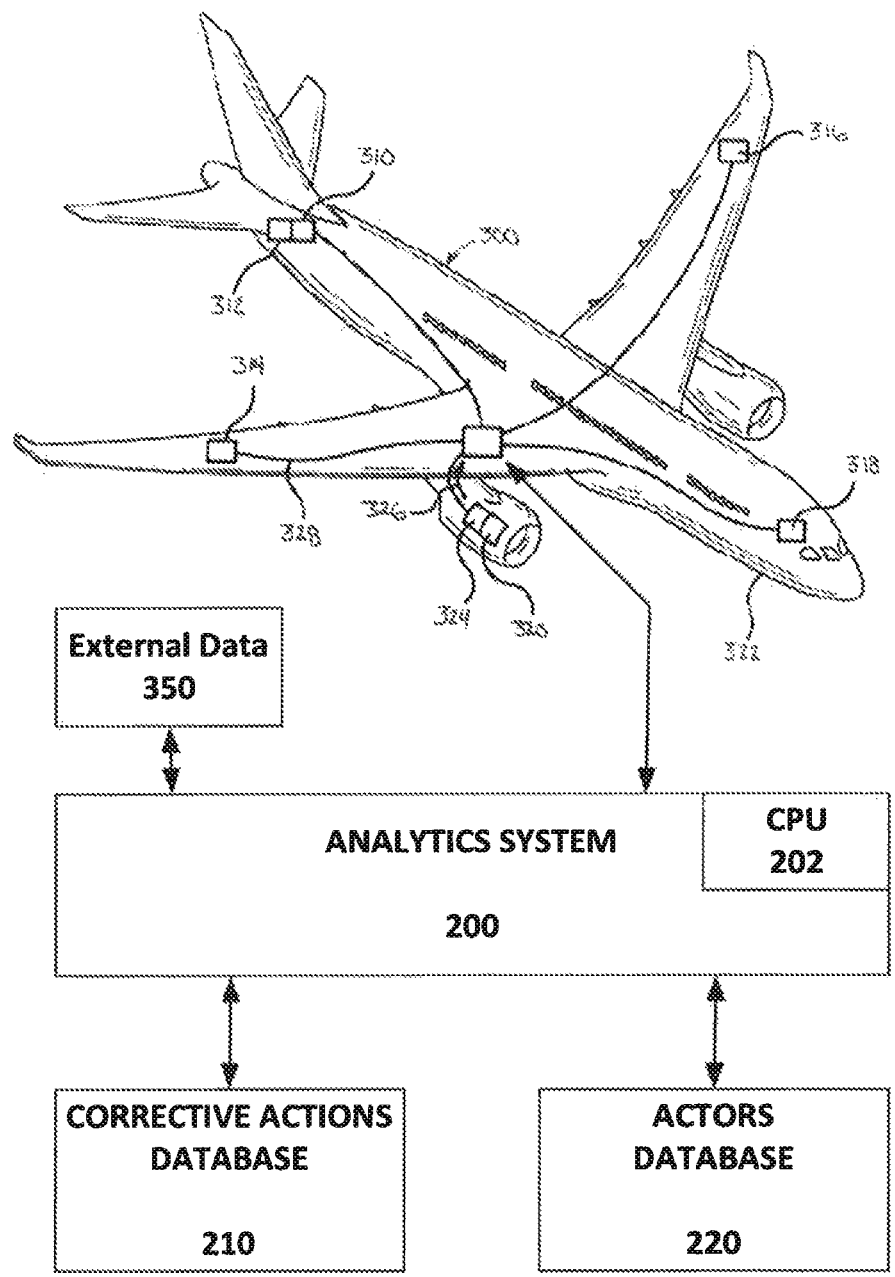
FIG. 2 is a system level diagram illustrating components of an illustrated embodiment communicatively coupled to a device.

FIG. 2 is a schematic block diagram of an example network analytics computing system 200 for preforming analytics in accordance with illustrated embodiments of the present disclosure that incorporates one or more components of above described processing system 100. For exemplary purposes only, system 200 is shown coupled to an Electronic Control Unit (ECU) 310 of an aircraft 300 for performing the below described analytics on an aircraft 300 having one or more computer coupled sensor devices/components 310-328. It is to be understood the analytical system 200 of the illustrated embodiments is not to be understood to be limited for use with an aircraft type device 300 as it is to be understood to be configurable to communicatively coupled to any suitable device having one or more software routines that detect and provide warnings/alerts for faults and/or predictive faults associated with intended operation of the device (e.g., an automobile or any other type of vehicle; machine device; alarm system; HVAC system, etc.)

In accordance with certain embodiments, the analytics system 200 is also preferably communicatively coupled (e.g., preferably via a network) to one or more data sources 350 residing external and separate from the device 300 such that the one or more data sources provide data to system 200 indicative of one or more alert conditions associated with the device 300. Such data from external data sources 350 may include alerts indicative of retrofit components; service bulletins; government notices; Federal Aviation Association (FAA) notices; and recall notices. For instance, a defect detected in one engine (associated with another aircraft/device) can result in a fleet wide alert for all engines. This may be in the form of a service bulletin, recall notice or a retrofit directive. In this scenario, the alerts are not directly generated from the device 300 (e.g., an aircraft) itself but rather via external data or external policies or external directives.

As explained above, in different embodiments these various components are configured to communicate with each other in any suitable way, such as, for example, via a communication network such as the Internet, WLAN, LAN, etc. System 200 is only one example of a suitable system and is not intended to suggest any limitation as to the scope of use or functionality of the illustrated embodiments described herein. Regardless, system 200 is capable of being implemented and/or performing any of the functionality set forth herein.

System 200 includes at least one Central Processing Unit (CPU) 202 networked coupled to the device 300. System 200 is also shown including, and coupled to, a corrective actions database 210 and an actors database 220 (which both databases may be rules-based), the description and functionality of which is described further below.

Figure 3:
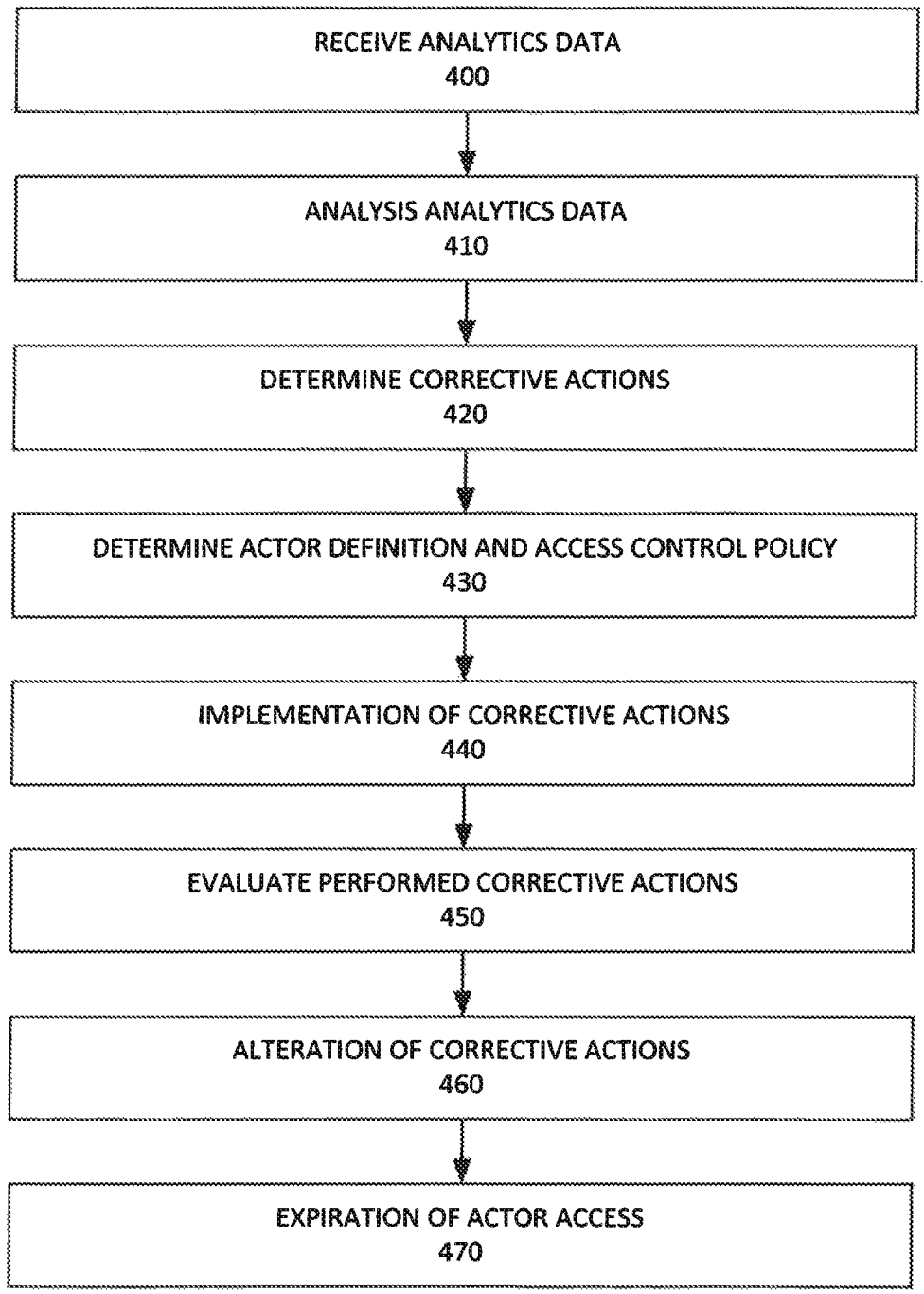
FIG. 3 is a flowchart illustrating operations of a method in accordance with embodiments of the present disclosure.

With reference now to FIG. 3, shown is a flow chart demonstrating implementation of the various exemplary embodiments regarding operation of system 200 coupled to a device 300. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Starting at step 400, data is received in system 200 from a device 300 that is indicative of one or more alert/fault conditions that are either present, or predicted to be present in device 300. It is to be appreciated the data may be either directly or indirectly received in the system 200 from one or more devices 300. Next, step 410, the received data is analyzed in system 200, preferably via CPU 202 to determine the type of alert/fault condition present to determine one or more corrective actions to mitigate the one or more alert/fault conditions indicated in the received data associated with device 300, step 420. It is to be appreciated, determining the corrective actions (step 420) preferably involves system 200 utilizing a database 210 having a plurality of corrective actions each associated with a particular alert/fault of a device 300 (e.g., such as a lookup table of corrective actions) that is periodically updated. The prescribed corrective actions may consist of any action to mitigate to the indicated alert/fault of a device 300, such as steps to be performed by a technician and/or diagnostic software subroutines to be executed on device 300. For instance, if the received alert/fault of a device 300 is indicative of a malfunctioning refrigeration coil in an HVAC system associated with device 300, the corrective action retrieved from database 210 may consist of steps to be performed by an HVAC technician as well as software diagnostics to be employed. It is to be appreciated that the corrective actions prescribed in the corrections actions database 210 may be updated based on the information derived from new effective and ineffective corrective actions, thus providing self-learning functionality.

Once the one or more corrective actions have been determined by system 200 (step 420), the system 200 determines one or more actor definitions and preferably control policy and permission functions for each defined actor, step 430. It is to be appreciated this step 430 preferably identifies the actors required to implement the one more identified corrective actions (step 420) as well as the scope and just-in-time policies governing data, access time periods for accessing certain data and/or providing hardware access, and software and hardware access permissions for the aforesaid identified actors required to implement the one or more identified corrective actions (step 420).

Determining the one or more actors (step 430) preferably involves system 200 utilizing a database 220 having a plurality of actors each associated with a particular corrective action (step 420) (e.g., such as a lookup table of actors) that is periodically updated. Actors may be selected from database 220 based on their recorded fix effectiveness ratings and metrics tracked based on prior history of effective problem resolution. It is to be understood the "actors" may consist of (and which is not to be understood to be limited to) human personal (e.g., technicians); software tools, hardware components; Artificial Intelligence (AI) software agents, cyber-physical systems (e.g., robots) and other suitable actor types. The process for selecting an actor (e.g., the actor selection criteria) may include reference to past and current certifications possessed by one or more actors, an education of an actor, qualifications of an actor, determined skill levels of an actor, one or more costs associated with an actor, and other suitable criteria applicable to selecting an actor for a particular corrective action.

It is to be further understood actor access to the aforesaid determined policies may be provided via one or more of: standard IT mechanisms; digital tokens (certificates); blockchain based authentication, two-factor verification processes; geofencing; biometrics; cybermetrics; and other suitable policy access mechanisms.

Once the corrective actions (step 420) and the associated actors (step 430) are determined and prescribed by system 200, implementation of the corrective actions on the device 300 is initiated by the actors in accordance with the prescribed policy governing guidelines (e.g., actor access to data/hardware is governed by prescribed time periods and access control), step 440. For instance, an actor (e.g., an HVAC technician) only has access to certain data (e.g., HVAC data) associated with device 300 for only a certain time period to control/limit exposure to data associated with device 300. It is noted, the system 200 may be configured to permit one or more prescribed actors to modify one or more corrective actions which preferably requires requests for further access permission (e.g., changes in prescribed policy). It is to be further appreciated that system 200 may be configured and operational to permit additional actors (e.g., inspectors) via policy modification, to have data access to perform certain tasks (e.g., verify proper implementation of one or more corrective actions), which access preferably expires upon completion of their assigned task (e.g., an inspection).

Next, at step 450, a determination is made by system 200 as to whether the one or more determined corrective actions have been successfully implemented to mitigate the one or more alert conditions (step 410). Preferably, system 200 is configured and operational to verify and validate corrective actions (step 450), Additionally, system 200 is preferably configured and operational to determine if escalation and engagement of additional actors is required to successfully implement the one or more prescribed corrective actions, step 460. This may be performed by system 200 on either a dynamic basis (e.g., automatic—without human intervention, such as based on determination of whether the one or more determined corrective actions has been successfully implemented to mitigate the one or more alert conditions), or on the basis of requests by one or more prescribed actors (step 430). Next, and once the system 200 determines the one or more prescribed corrective actions were properly implemented to mitigate the aforesaid one or more alert conditions associated with device 300, system 200 modifies granted policy permissions to the prescribed one or more actors (step 430), step 470. These modifications include removing actor access to data/software/hardware associated with device 300 or incrementally limiting or expanding the scope of granted permissions provided to the one or more actors, which may be dependent upon the type of corrective action implemented (preferably via changes in prescribed policy permissions (step 430)).

Thus, certain advantages provided by the above described illustrated embodiments include (but are not to be understood to be limited to): effective control of administrative costs associated with granting and restricting access to data/software/hardware associated with one or more devices; the provision of expedited service response and device access on a continual basis (e.g., just-in-time access control); effective control of access to data by personal and/or AI bots; and prevention of data loss contributable to compromise of access credentials to unintended actors and/or AI bots.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method, implemented by a computer, for optimizing operation of an aircraft having one or more associated software routines for operating the aircraft, the method comprising:
   receiving data, via a network from an Electronic Control Unit (ECU) coupled to the aircraft, indicative of one or more alert conditions associated with the one or more associated software routines for operating the aircraft;
   analyzing the received data associated with the one or more alert conditions to determine one or more corrective actions to mitigate the one or more alert conditions by making reference to corrective actions data stored in a corrective action database;
   determining one or more actors for implementing the determined one or more corrective actions based upon the one or more alert conditions and the determined one or more corrective actions;
   providing data, software and hardware access permissions relating to the one or more associated software routines to the determined one or more actors;
   providing machine-learning functionality to the corrective action database by updating the corrective action database with information derived from determined effective and ineffective correction actions;
   determining whether the determined one or more corrective actions have been successfully implemented to mitigate the one or more alert conditions; and
   changing the data, software and hardware access permissions relating to the one or more associated software routines provided to the determined one or more actors when the determined one or more corrective actions have been successfully implemented, which is contingent upon a type of corrective action implemented.

2. The computer method as recited in claim 1, wherein the data indicative of the one or more alert conditions includes alerts indicative of at least one of: retrofit components; service bulletins; government notices; Federal Aviation Association (FAA) notices; and recall notices.

3. The computer method as recited in claim 1, further comprising:
   determining whether alteration of the one or more corrective actions is required based at least in part on input provided by the determined one or more actors.

4. The computer method as recited in claim 3, wherein determining whether alteration of the one or more corrective actions is required is based at least in part on the determination of whether the determined one or more corrective actions have been successfully implemented to mitigate the one or more alert conditions.

5. The computer method as recited in claim 3, wherein determining whether alteration of the one or more corrective actions is required to mitigate the one or more alert conditions is performed without human intervention.

6. The computer method as recited in claim 3, wherein determining whether alteration of the one or more corrective actions is required to mitigate the one or more alert conditions includes determining additional time is needed for performing the determined one or more corrective actions.

7. The computer method as recited in claim 3, wherein determining whether alteration of the one or more corrective actions is required to mitigate the one or more alert conditions includes changing the data access permission provided to the determined one or more actors or one or more newly determined actors.

8. The computer method as recited in claim 1, wherein the one or more alert conditions are indicative of a system fault associated with the aircraft or a predicative alert indicative of an anticipated future fault associated with the aircraft.

9. The computer method as recited in claim 1, wherein analyzing the received data associated with the one or more alert conditions includes accessing a rules-based database containing a plurality of corrective actions to perform based upon one or more certain alert conditions.

10. The computer method as recited in claim 1, wherein determining the one or more actors includes accessing a rules-based database containing a plurality of actors to implement the determined one or more corrective actions based upon one or more certain alert conditions.

11. The computer method as recited in claim 1, wherein determining the one or more actors includes determining a scope of data access to data associated with the aircraft for the determined one or more actors.

12. The computer method as recited in claim 1, wherein determining the one or more actors includes determining a scope of hardware access to hardware associated with the aircraft for the determined one or more actors.

13. The computer method as recited in claim 1, wherein determining the one or more actors includes determining a time period the determined one or more actors are provided for performing the determined corrective actions for mitigating the one or more alert conditions.

14. The computer method as recited in claim 1, wherein the determined one or more actors are selected from the group consisting of: human personal; Information Technology (IT) mechanisms; hardware components; and Artificial Intelligence (AI) agents.

15. The computer method as recited in claim 1, wherein providing the data, software and hardware access permissions relating to the one or more associated software routines to the determined one or more actors includes providing data, software and hardware access permissions relating to the one or more associated software routines to the determined one or more actors for a predetermined period of time.

16. A computer system for optimizing operation of an aircraft having one or more software routines, the computer system comprising:
 a corrective action database containing a plurality of corrective actions to perform;
 an actors database containing a plurality of actors to implement one or more corrective actions;
 a processor; and
 a memory accessible by the processor and having instructions stored in the memory and executable by the processor to instruct the computer system to:
  receive data, via a network from an Electronic Control Unit (ECU) coupled to the aircraft, indicative of one or more alert conditions associated with the aircraft;
  analyze the received data associated with the one or more alert conditions to determine one or more corrective actions from the corrective action database to mitigate the one or more alert conditions;
  determine one or more actors from the actors database for implementing the determined one or more corrective actions based upon the one or more alert conditions and the determined one or more corrective actions;
  provide data, software and hardware access permissions relating to the one or more software routines to the determined one or more actors;
  determine whether alteration of the one or more corrective actions is required to mitigate the one or more alert conditions;
  provide machine-learning functionality to the corrective action database by updating the corrective action database with information derived from determined effective and ineffective correction actions;
  determine whether the determined one or more corrective actions have been successfully implemented to mitigate the one or more alert conditions; and
  change the data, software and hardware access permissions relating to the one or more software routines provided to the determined one or more actors when the determined one or more corrective actions have been successfully implemented, which is contingent upon a type of corrective action implemented.

17. The computer system as recited in claim 16, wherein the instructions that are executable by the processor to instruct the computer system to determine whether alteration of the one or more corrective actions is required comprise:
 instructions that are executable by the processor to instruct the computer system to determine whether alteration of the one or more corrective actions is required based at least in part on input provided by the determined one or more actors; and
 wherein the corrective action database is updated based on the information derived from new effective and ineffective corrective actions.

18. The computer system as recited in claim 16, wherein the instructions that are executable by the processor to instruct the computer system to determine whether alteration of the one or more corrective actions is required comprise:
 instructions that are executable by the processor to instruct the computer system to determine whether alteration of the one or more corrective actions is required based at least in part on the determination of whether the determined one or more corrective actions have been successfully implemented to mitigate the one or more alert conditions.

19. The computer system as recited in claim 16, wherein the determined one or more actors are selected from the group consisting of: human personal; Information Technology (IT) mechanisms; hardware components; and Artificial Intelligence (AI) agents; and
 wherein the data indicative of the one or more alert conditions includes alerts indicative of at least one of: retrofit components; service bulletins; government notices; Federal Aviation Association (FAA) notices; and recall notices.

20. The computer system as recited in claim 16, wherein the instructions that are executable by the processor to instruct the computer system to provide the data, software and hardware access permissions relating to the one or more software routines to the determined one or more actors includes instructions that are executable by the processor to instruct the computer system to provide the data, software and hardware access permissions relating to the one or more software routines to the determined one or more actors for a predetermined period of time.

* * * * *